United States Patent
Johnston, II et al.

(10) Patent No.: US 8,495,358 B2
(45) Date of Patent: Jul. 23, 2013

(54) SOFTWARE BASED MULTI-CHANNEL POLYMORPHIC DATA OBFUSCATION

(75) Inventors: Richard Fendall Johnston, II, Salem, OR (US); William J. Strauss, Independence, OR (US); Dean Pierce, Portland, OR (US)

(73) Assignee: Dis-Ent, LLC, Las Vegas, NV (US)

( * ) Notice: Subject to any disclaimer, the term of this patent is extended or adjusted under 35 U.S.C. 154(b) by 343 days.

(21) Appl. No.: 12/676,762

(22) PCT Filed: Sep. 8, 2008

(86) PCT No.: PCT/US2008/075557
§ 371 (c)(1),
(2), (4) Date: Jun. 23, 2010

(87) PCT Pub. No.: WO2009/033137
PCT Pub. Date: Mar. 12, 2009

(65) Prior Publication Data
US 2010/0257354 A1 Oct. 7, 2010

Related U.S. Application Data (60) Provisional application No. 60/970,722, filed on Sep. 7, 2007.

(51) Int. Cl.
*H04L 29/06* (2006.01)
*H04L 63/08* (2006.01)
(52) U.S. Cl.
USPC ............................................. 713/153; 726/4
(58) Field of Classification Search
USPC ... 715/773; 713/153, 152, 154, 155; 380/255, 380/287; 726/3, 4, 5, 6, 7
See application file for complete search history.

(56) References Cited

U.S. PATENT DOCUMENTS

| | | | |
|---|---|---|---|
| 6,006,328 A * | 12/1999 | Drake | 726/23 |
| 6,553,377 B1 | 4/2003 | Eschelbeck et al. | |
| 7,178,721 B2 * | 2/2007 | Maloney | 235/375 |
| 7,730,542 B2 * | 6/2010 | Cronce et al. | 726/26 |
| 7,742,996 B1 * | 6/2010 | Kwan | 705/72 |
| 7,814,432 B2 * | 10/2010 | Ashe et al. | 715/810 |
| 7,921,454 B2 * | 4/2011 | Cerruti et al. | 726/5 |
| 7,925,012 B2 * | 4/2011 | Lecomte et al. | 380/42 |
| 8,060,747 B1 * | 11/2011 | Leonard et al. | 713/176 |
| 8,103,246 B2 * | 1/2012 | Singhal | 455/411 |
| 8,209,743 B1 * | 6/2012 | Frank | 726/2 |
| 8,307,412 B2 * | 11/2012 | Ozzie et al. | 726/6 |
| 8,353,017 B2 * | 1/2013 | Cerruti et al. | 726/5 |
| 2002/0157021 A1 * | 10/2002 | Sorkin et al. | 713/201 |
| 2002/0162017 A1 * | 10/2002 | Sorkin et al. | 713/201 |

(Continued)

OTHER PUBLICATIONS

Supplementary European Search Report; Dec. 14, 2012.

(Continued)

*Primary Examiner* — Eleni Shiferaw
*Assistant Examiner* — Abu Sholeman
(74) *Attorney, Agent, or Firm* — Polster, Lieder, Woodruff & Lucchesi, L.C.

(57) ABSTRACT

A method and system for providing secure communication between a server and a remote client utilizing a polymorphic software platform. In various embodiments, the system provides mixed mode data entry, meaningless field entries and randomly generated false entries interpolated into the real entries for providing a secure system of communication such that a third party has no repeatable method of decoding the information transmitted.

18 Claims, 4 Drawing Sheets

U.S. PATENT DOCUMENTS

| | | | |
|---|---|---|---|
| 2003/0204732 A1* | 10/2003 | Audebert et al. | 713/182 |
| 2004/0015512 A1* | 1/2004 | Ashe et al. | 707/102 |
| 2006/0104446 A1* | 5/2006 | Varghese et al. | 380/255 |
| 2007/0168678 A1 | 7/2007 | Meenakshisundaram | |
| 2007/0169181 A1* | 7/2007 | Roskind | 726/5 |
| 2007/0213125 A1* | 9/2007 | Szrek et al. | 463/29 |
| 2007/0250920 A1* | 10/2007 | Lindsay | 726/7 |
| 2007/0277224 A1* | 11/2007 | Osborn et al. | 726/2 |
| 2008/0313721 A1* | 12/2008 | Corella | 726/6 |
| 2010/0077483 A1* | 3/2010 | Stolfo et al. | 726/24 |
| 2010/0251347 A1* | 9/2010 | Roskind | 726/5 |
| 2011/0265159 A1* | 10/2011 | Ronda et al. | 726/6 |
| 2012/0084866 A1* | 4/2012 | Stolfo | 726/25 |

OTHER PUBLICATIONS

Article: "Just iin time compressionand obfuscation of HTML and script languages"; IP.com Journal; IP.com Inc., West henrietta, NY, Dec. 17, 2006.

* cited by examiner

FIG. 3

SOFTWARE BASED MULTI-CHANNEL POLYMORPHIC DATA OBFUSCATION

CROSS-REFERENCE TO RELATED APPLICATIONS

This application derives priority from and otherwise claims the benefit of International Application PCT/US2008/075557, filed 8 Sep. 2008 and published under International Publication Number WO 2009/049131, and from U.S. Provisional Application No. 60/970,722 filed Sep. 9, 2007, both of which are incorporated by reference herein.

COPYRIGHT NOTICE

A portion of the disclosure of this patent document contains material which is subject to copyright protection. The copyright owner has no objection to the reproduction by anyone of the patent disclosure as it appears in the United States Patent and Trademark Office records, but otherwise reserves all copyrights whatsoever.

BACKGROUND OF THE INVENTION

This disclosure relates to encryption, more specifically, the disclosure relates it to a system for a computer implemented device and method for neutralizing methods for obtaining sensitive data from a data stream.

The introduction of more complex security measures to protect online financial accounts has only resulted in more clever schemes to steal the personal credentials needed to commit fraud. Armed with keystroke logging software or simply by using a clever malware form grabbing virus and spyware, online criminals can steal identify credentials necessary to take over accounts and sensitive information. Malware and form grabbing viruses and spyware are predominantly aimed at stealing online user information. However, evidence indicates that the number of attempts to hack into financial accounts is increasing substantially. For this reason, businesses with an online presence must employ a strong user authentication, data input and storage capabilities as well as more secure user data transmission.

User authentication during internet based online transactions needs to be upgraded from the now current generally accepted single factor authentication process, typically only based on user name and passwords, with a stronger more secure multi-form of user authentication. Websites also must stop transmitting sensitive data via plain text that can easily be captured via the internet. This disclosure provides solutions that are essentially plug-and-play and thus do not require extensive retro-fitting in order to add them to existing technical infrastructure. The methodology described hereinafter implements multiple layers of user authentication in ways that reduce the impact on the user experience, i.e., it is intended to be very intuitive and user-friendly, while properly defending against attacks on transactions that are highly vulnerable to fraud or attack with present systems.

BRIEF SUMMARY OF THE INVENTION

Briefly stated, the present disclosure includes polymorphic software that changes each time it is executed while keeping the parent algorithm intact.

More particularly, in various embodiments, the present disclosure provides a secure communication network, wherein the network can include at least one client device communicatively connectable to a host server to communicate data between the client device and the host server. In various implementations the host server can include a means associated with the host server for polymorphically generating and embedding a plurality of obfuscation data and program code into a source code for a data entry form and a means associated with the host server for transmitting the source code for the data entry form to the client device. Additionally, in various implementations the client device can include a means associated with the client device for establishing a communications connection with the host device and a means associated with the client device for interpreting the obfuscation data embedded in the data entry form source code to generate an interactive data entry page including a plurality of interactive data entry fields and a virtual keypad, the interactive data entry page rendered on a display of the client device. The client device can further include a means associated with the client device for interpreting and executing the program code embedded in the data entry form source code to obfuscate data entered in at least one of the interactive data entry fields using a first user interface device of the client device and transmute data entered in at least one of the interactive data entry fields using a second user interface device.

In various other embodiments, the present disclosure provides a method for providing secure communication within a communications network, wherein the method includes establishing a communications connection with a client device and a host device of the communications network. The method can additionally include polymorphically generating and embedding a plurality of obfuscation data and program code into a source code for a data entry form at the host server and transmitting the source code for the data entry form to the client device. Furthermore, the method can include executing an interface program stored on the client device to interpret the obfuscation data embedded in the data entry form source code and generate an interactive data entry page rendered on a display of the client device utilizing the obfuscation data, the interactive data entry page including a plurality of interactive data entry fields and a virtual keypad. Execution of the interface can additionally affect the interpretation and execution of the program code embedded in the data entry form source code to obfuscate data entered in at least one of the interactive data entry fields using a first user interface device of the client device and transmute data entered in at least one of the interactive data entry fields using a second user interface device.

In still other embodiments, the present disclosure provides a method of user authentication for a communications network, wherein the method includes establishing a communications connection with a client device and a host device of the communications network, via the communication router of the communications network. The method can additionally include polymorphically generating and embedding a plurality of obfuscation data and program code into a source code for a data entry form at the host server and transmitting the source code for the data entry form to the client device. Furthermore, the method can include executing a router interface program stored on the client device to interpret the obfuscation data embedded in the data entry form source code and generate an interactive data entry page rendered on a display of the client device utilizing the obfuscation data, the interactive data entry page including a plurality of interactive data entry fields and a virtual keypad. Execution of the router interface can additionally affect interpretation and execution of the program code embedded in the data entry form source code to obfuscate data entered in at least one of the interactive data entry fields using a first user interface device of the client device and transmute data entered in at least one of the interactive data entry fields using a second user interface device.

Execution of the router interface can further affect concatenation of the data entered using the first and second user interface devices, application of a random salt to the concatenated data, the random salt generated at the host server and embedded in the data entry from source code, hashing of the salted data, and passing of the hashed data to the host server. Finally, the method can include decrypting the hashed data at the host server, comparing the decrypted data to user credential data stored in an electronic mass storage database of the host device, and authenticating a user of the client device based on the data comparison.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

While aspects of this disclosure are susceptible of embodiments in many different forms that are shown in the drawings and will herein be described in detail, various embodiments are described in detail with the understanding that the present disclosures are to be considered as an exemplification of the principles of the disclosure and are not intended to limit the broad aspects of the disclosure to the embodiments illustrated.

The present disclosure can be embodied in the form of computer-implemented processes and apparatuses for practicing those processes. The present disclosure can also be embodied in the form of computer program code containing instructions embodied in tangible media, such as floppy diskettes, CD-ROMs, hard drives, or any other computer readable storage medium, wherein, when the computer program code is loaded into, and executed by, an electronic device such as a computer, micro-processor or logic circuit, the device becomes an apparatus for practicing the invention set out in the appended claims.

The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

Figure 1:
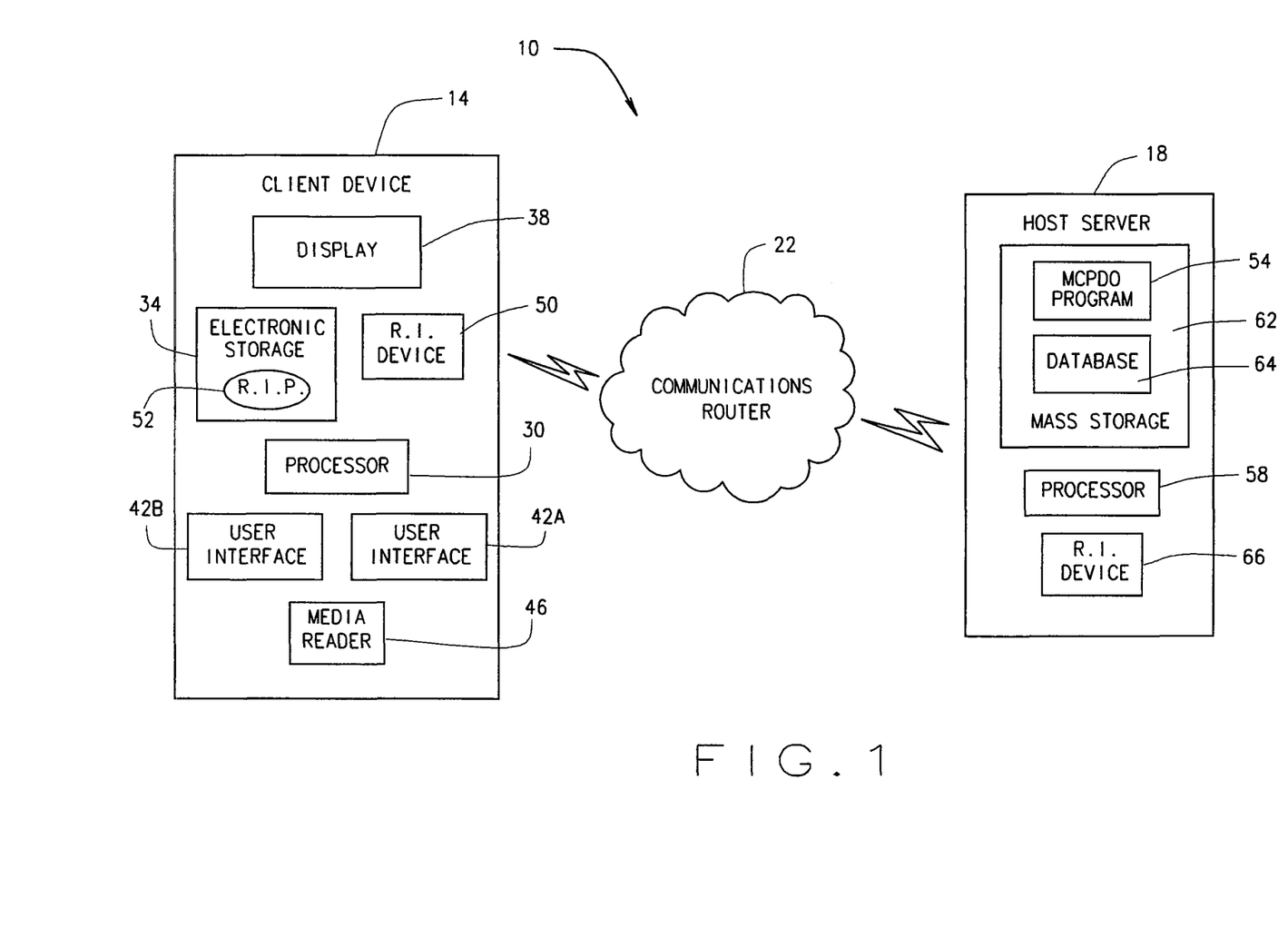
FIG. 1 is a block diagram of a computer-base network for administering a software based multi-channel polymorphic data obfuscation mechanism, in accordance with various embodiments of the present disclosure.

FIG. 1 is an illustration of an exemplary computer-based network 10, such as a local area network (LAN) or a wide area network (WAN) that is structured and operable to implement a software based multi-channel polymorphic data obfuscation mechanism, as described below. In various embodiments, the network 10 can include at least one client device 14 communicatively connectable to a host server 18, e.g., a web server, through a communication router 22, e.g., the Internet, to communicate data between the client device 14 and the host server 18.

Although the network 10 can include a plurality of client devices 14 operatively connected to the host server 18, for simplicity and clarity, the network 10 will be described herein with reference to a single client device 14. However, it should be understood that the provisions of the present disclosure are equally applicable to embodiments including a plurality of client devices 14, each configured to operate substantially the same as the single client device described below, and such embodiments remain within the scope of present disclosure.

In various implementations, the client device 14 can be a computer that includes a processor 30 suitable to execute all functions and programs of the client device 14. The client device 14 can additionally include at least one electronic storage device 34 that comprises a computer readable medium, such as a hard drive or any other electronic data storage device for storing such things as software packages or programs, algorithms and digital information, data, look-up tables, electronic spreadsheets and databases, etc. The client device 14 can further include a display 38 for displaying such things as information, data and/or graphical representations, and a plurality of user interface devices 42, for example a first user interface device 42A and a second user interface device 42B. Each user interface device 42 can be any suitable interface device such as a keyboard, mouse, stylus, microphone, scanner and/or an interactive touch-screen on the display 38, and the client device 14 can include any combination of two or more of such user interface devices 42.

In various embodiments, the client device 14 can still further include a removable media reader 46 for reading information and data from, and/or writing information and data to, removable electronic storage media such as floppy disks, compact disks, DVD disks, zip disks, or any other computer readable removable and portable electronic storage media. Alternatively, the removable media reader 46 can be an I/O port utilized to communicate with external or peripheral memory devices such as thumb drives, memory sticks/cards or external hard drives. Still further, the client device 14 can include a router interfacing device 50 for communicating data with the communications router 22, such as a dial-up modem, a cable modem, a satellite connection, a DSL (Digital Subscriber Line) connection, an Ethernet port, or the like.

Alternate embodiments of the client device 14 can include any electrical or electronic device capable of communicating with the host server 18 via the communications router 22, such as, for example, a personal digital assistant (PDA), cellular phone, a telephone operating with an interactive voice-system, or a television operating with a cable or satellite television interactive system.

Although, as describe above, in various embodiments, the network 10 can be any computer-based network, such as a LAN or a WAN, for simplicity and clarity, the network 10 will be described below with regard to various WAN embodiments. However, it should be understood that the provisions of the present disclosure are equally applicable to any other computer-based network where secure communications between the client device 14 and the host server 18 is desired, and that such embodiments remain within the scope of the present disclosure.

Accordingly, in various embodiments, the processor 30 is capable of running a router interfacing program 52, such as a web browser program and hereafter referred to as the web browser 52, to communicate with the host server 18, exemplarily a web server and hereafter referred to as the web server 18, via the communications router 22, exemplarily the Internet and hereafter referred to as the Internet 22. Generally, in such embodiments, a user can interact with the client device 14 by viewing data, via the display 38, and entering data, via the user interface devices 42. The web browser 52 allows the user to enter addresses of specific web pages to be retrieved, which are referred to as Uniform Resource Locators, or URLs. The web pages can contain various types of content from plain textual information to more complex multimedia and interactive content, such as software programs, graphics, audio signals, videos, and so forth. A set of interconnected web pages, usually including a homepage, are managed on the web server 18 as a collection collectively referred to as a website. The content and operation of such websites are managed by the web server 18. More particularly, as described below, the web server 18 executes and implements a multichannel polymorphic data obfuscation (MCPDO) program 54 to obfuscate data transmitted between the client device 14 and the web server 18, thereby providing secure communications between the client device 14 and the web server 18. Additionally, in various embodiments, the web server 18 executes and implements the MCPDO program 54 to obfuscate data transmitted between the client device 14 and the web server 18 in order to provide secure user authentication and data communication during Internet based online transactions.

The Internet 22 can utilize any suitable communications protocol, such as HyperText Transfer Protocol (HTTP), to communicate data between the client device 14 and web server 18. However, as described above, the communications router 22 can be any data exchange network that implements a respective suitable communications protocol, such as FTP (File Transfer Protocol), SNMP (Simple Network Management Protocol), TELNET (Telephone Network), and the like.

In various embodiments, the host server 18, e.g., the web server 18 comprises a computer system including a processor 58 and an electronic mass storage device 62 having the MCPDO program 54 stored thereon. Additionally, the web server 18 includes at least one database 64 that resides on the mass storage device 62. The web server 18 is appropriately equipped with a router interfacing device 66 for communicating data with the client device 14, such as a dial-up modem, a cable modem, a satellite connection, a DSL connection, an Ethernet port, or the like. Generally, when the client device 14 initiates communications with the web server 18, via the Internet 22, the web server 18 executes the MCPDO program 54 to polymorphically generate and embed a plurality of obfuscation data and program code into the source code of a data entry form that is transmitted to the client device 14. Upon receipt of the data entry form, the client device web browser 52 interprets the obfuscation data and program code, renders an interactive data entry page 200 (shown in FIG. 3) utilizing the obfuscation data, and implements the obfuscation program code.

Referring now to FIGS. 1, 2, 2A and 3, FIGS. 2 and 2A provide a flow chart 100 that illustrates the operation and functionality of the network 10 during execution and implementation of the MCPDO program 54, in accordance with various embodiments of the present disclosure. Initially, a user utilizes one or more of the user interface devices 42 to execute the web browser 52 and establish connection between the client device 14 and the web server 18, via the Internet 22, as indicated at 102. Upon connection with the client device 14, the web server 18 executes the MCPDO program 54.

Figure 2:
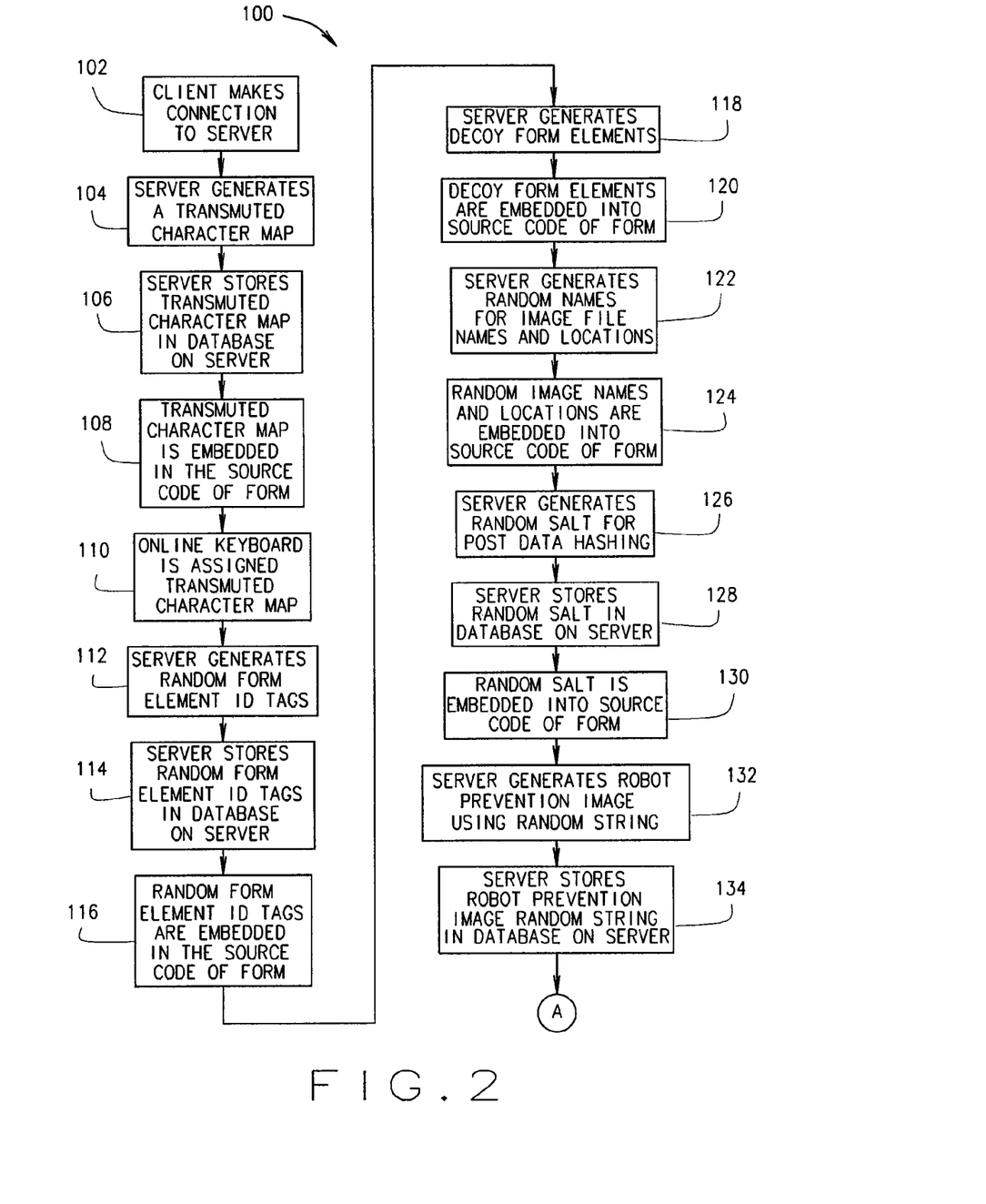
FIGS. 2 and 2A provide a flow chart illustrating a method of implementation of the software based multi-channel polymorphic data obfuscation mechanism as administered by the system shown in FIG. 1, in accordance with various embodiments of the present disclosure.
Figure 2A:
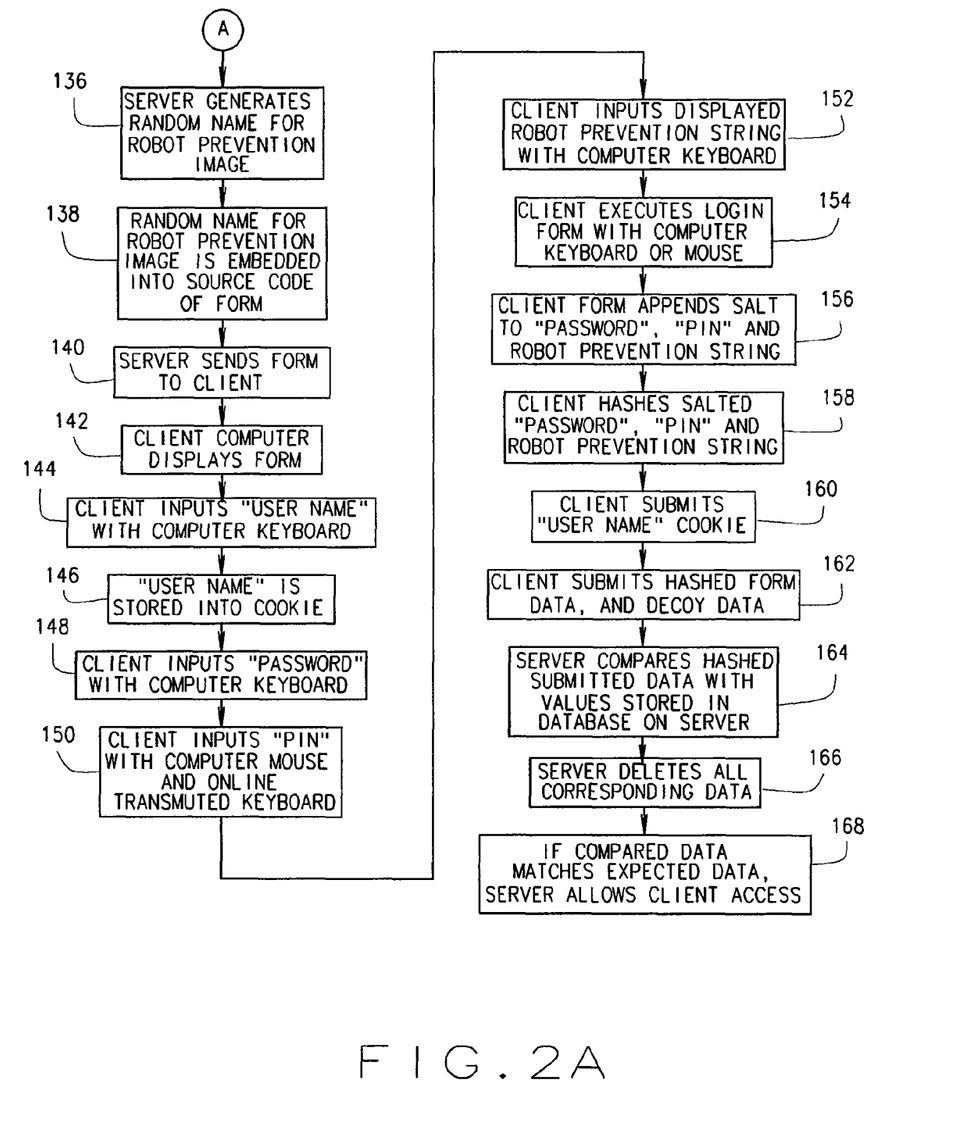

It should be understood that the following description of the web server 18 functionality results from execution of the MCPDO program 54 by the web server processor 58. That is, although the following description will make reference to the web server 18 performing various functions, it should be understood that, ultimately, it is the execution of the MCPDO program 54 by the web server processor 58 and the resulting processes and operations, as controlled by the web server processor 58, that affects the following web server 18 functionality.

Figure 3:
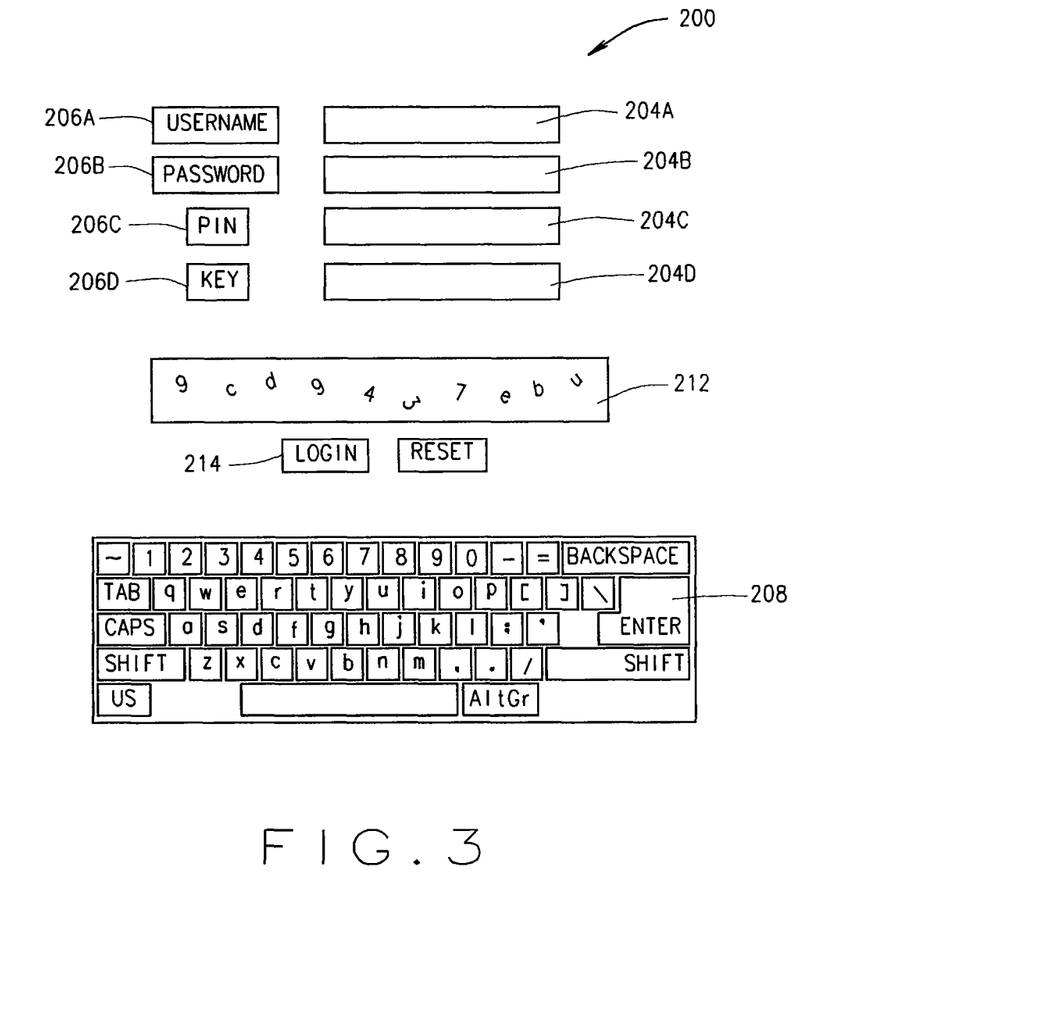
FIG. 3 is a diagrammatic view of a software based keyboard that allows data entry to the system of FIG. 1, in accordance with various embodiments of the present disclosure.

Upon execution of the MCPDO program 54, the web server 18 randomly generates a transmuted character map and stores the transmuted character map in the database 64, as indicated at 104 and 106. The web server 18 then initiates the generation of the data entry form and associated source code to be subsequently passed, or transmitted, to the client device 14 and executed by the web browser 52 to provide an interactive data entry page displayed on the client device display 38. An exemplary interactive data entry page 200, e.g., a Login form, that can be generated by the web browser 52 based on the source code of the web server generated form, is illustrated in FIG. 3. In various embodiments, the interactive data entry page 200 can include a plurality of interactive data entry fields 204, for example, a Username field 204A, a Password field 204B, a PIN field 204C, a Key field 204D and any other desired field. The interactive data entry page 200 further includes a field label 206 associated with each interactive field 204, e.g., a Username label 206A, a Password label 206B, a PIN label 206C, and a Key label 206D. It should be noted that, in various embodiments, each field label 206 is rendered as an image, as opposed to text, e.g., HTML text, which is easily identified by spyware, malware, viruses, etc., herein referred to as attacker software. Additionally, in various embodiments, the interactive data entry page 200 can include a graphic, e.g., virtual or online, keypad 208 and random alpha/numeric robot prevention image 212.

It should be understood that each connection between the client device 14 and web server 18, as described herein, will generate data entry form source code that is completely random and different than any prior or subsequently generated source code, but, when utilized by the client device web browser 52, will graphically generate the same interactive data entry page 200.

Next, the web server 18 embeds the transmuted character map into the source code of the data entry form and assigns the transmuted character map to the virtual keypad 208 that will be generated by the client device web browser 52 upon receipt of the data entry form, as indicated at 108 and 110.

The server then generates a plurality of random form element identification (ID) tags, stores the randomly generated form element ID tags in the database 64, and embeds the randomly generated form element ID tags in the source code of the data entry form, as indicated at 112, 114 and 116. Next, the web server 18 generates a plurality of decoy form elements associated with each element ID tag and embeds the decoy form elements in the source code of the data entry form, as indicated at 118 and 120. Thereafter, the web server 18 will generate random names to be associated with image file names and locations stored on the mass storage device 62 of the web server 18 and embeds names in the data entry form source code, as indicated at 122 and 124. The associated image files that are identified by the randomly generated names are subsequently passed to the client device 14 and utilized by the web browser 52 to generate the images for field labels 206 of each interactive field 204. Thus, although the client device web browser 52 will utilize the element ID tags and image file names embedded in the data entry form source code to graphically generate the same interactive fields 204 and field labels 206 of the interactive data entry page 200, each time the MCPDO program 54 is executed, the form element ID tags and image file names passed from the web server 18 to the client device 14, via the data entry form source code, will be randomly generated and different each time the MCPDO program 54 is executed. Therefore, it will be difficult for attacker software, to capture, track or decipher the element ID tags. Additionally, the decoy form elements will be passed to the client device web browser 52 and then passed back to the web server 18 as invalid, or decoy, POST data along with valid POST data input to the interactive data entry page 200 by the user. Therefore, it will be difficult for attacker software, to capture, track or decipher the valid POST data.

Thereafter, the web server 18 generates random salt for POST data hashing, stores the randomly generated salt in the web server database 64, and embeds the salt in the data entry form source code, as indicated at 126, 128 and 130. Next, the web server 18 generates a random robot prevention alpha/numeric string and stores the random robot prevention string in the web server database 64, as indicated at 132 and 134. The random robot prevention string will be rendered as the robot prevention image 212 by the web browser 52, upon receipt of the data entry form from the web server 18 by client device 14. It should be noted that robot prevention image 212 is rendered as an image, as opposed to text, e.g., HTML text, which is easily identified by attacker software. Next, the web server 18 generates a random name for the robot prevention image and embeds the random robot prevention image name into the data entry form source code, as indicated a 136 and 138. Therefore, the robot prevention image and name will be randomly generated and different each time the MCPDO program 54 is executed, thereby making it will be difficult for attacker software, to capture, track or decipher the robot prevention image and associated POST data.

Once the web server 18 has compiled the source code for the data entry form to include the various randomly generated data, as described above, the web server 18 passes, or transmits, the data entry form and respective source code to the client device 14, as indicated at 140. It should be noted that although an exemplary sequence of randomly generated data has been described above, any suitable random data generation sequence can be implemented via execution of the MCPDO program 54 and remain within the scope of the present disclosure.

Upon receipt of the data entry form and respective source code, the web browser 52 running on the client device 14 will interpret the source code, render the interactive data entry page 200 on the client device display 38 and execute the following functionality based on the source code, as indicated at 142. That is, interpretation of the source code provides a 'client-side' multi-channel polymorphic data obfuscation (csMCPDO) program, not shown, but readily understood by one skilled in the art to temporarily reside on the client device electronic storage device 34 and executable by the client device processor 30. Additionally, it should be understood that the following description of the client device 14 functionality results from execution of the csMCPDO by the client device processor 30. That is, although the following description will make reference to the client device 14 performing various functions, it should be understood that, ultimately, it is the execution of the csMCPDO program by the client device processor 30 and the resulting processes and operations, as controlled by the client device processor 30, that affects the following client device 14 functionality. Furthermore, it should be understood that the following functionality will be described in reference to the exemplary interactive data entry page 200, e.g., a Login form, shown in FIG. 3, but is equally applicable to other rendered interactive pages, while remaining within the scope of the present disclosure.

In various embodiments, the interactive fields 204 of the interactive data entry page 200 are completed, i.e., data is entered, by the user utilizing a plurality of user interface devices 42, also referred to herein as multi-channel data input. For example, the user can be required to input some data using the keyboard 42A and input other data using the mouse 42B in combination with the virtual keypad 208. Utilization of the multi-channel input makes it difficult for attacker software to monitor, track or read user input data. Additionally, the various interactive fields 204 can be completed using any combination or sequence to user interface device 204. For example, once the interactive data entry page 200 is rendered, via the web browser 52, the user can input Username data into the Username interactive field 204A, using a physical keyboard 42A of the client device 14, as indicated at 144. Subsequently, in various embodiments, the client device 14 will store the input Username data in a Cookie to allow the POST data to be correlated with the data in the web server database 64, as indicated at 146. That is, the Cookie is used as an identifier in the POST data to allow the web server 18 to search the database 64 for the credential associated with the user, i.e., associated with POST data provided by the user input to the interactive fields 204.

Next, the user can input Password data into the Password interactive field 204B, using the physical keyboard 42A of the client device 14, as indicated at 148. More particularly, the data input to the Password interactive field 204B is transmuted via execution of the csMCPDO program and temporarily stored on the client device electronic storage device 34. After the Password data is entered, the user can input PIN data into the PIN interactive field 204C, using a mouse 42B of the client device 14 and the only transmuted keypad 208, as indicated at 150. Accordingly, the data input to the PIN interactive field 204C is transmuted and temporarily stored on the client device electronic storage device 34. Subsequently, the user can input the displayed alpha/numeric robot prevention image 212 utilizing the keyboard 42A of the client device 14, as indicated at 152. Additionally, the alpha/numeric data input of the robot prevention image 212 is transmuted via execution of the csMCPDO program and temporarily stored on the client device electronic storage device 34. The user can then select a login button 214, via any one of the user interface devices 42, to submit the completed Login form, i.e., the interactive data entry page 200, as indicated at 154. Subsequently, the client device 14 concatenates the transmuted input Password, PIN and robot prevention image data, appends the salt to the concatenated data, hashes the salted concatenated data, and passes the Username Cookie, the decoy data (described above) and the block of hashed data, i.e., POST data, back to the web server 18, as indicated at 156, 158, 160 and 162.

Once the web server 18 receives the Username Cookie, decoy data and the block of hashed POST data, the server utilizes the transmuted character map, the random element ID tags and the random salt stored on the web server database 64 (described above) to decrypt the block of hashed POST data.

Subsequently, in various embodiments, the web server 18 uses the Cookie to identify the user credentials data stored on the web server database 64 and then compares the decrypted data with the corresponding user credentials, as indicated at 164. The web server 18 then deletes the block of hashed POST data, the Username Cookie and the decoy data received from the client device 14, as indicated at 166. If the decrypted data matches the user credentials stored on the web server database 64, the web server 18 allows the user access, via the client device 14, as indicated at 168.

Therefore, via application of network 10 and the implementation of the MCPDO program 54, as described herein, no two user sessions, even if conducted by the same user using the same client device 14, generate the same POST data. Thus, it is very difficult for any virus, spyware, malware and such, i.e., attacker software, to interpret, track or decipher the data transmitted between the client device 14 and the web server 18.

It should be understood that although the network 10 and implementation of MCPDO program 54 have been exemplarily described above with regard to authenticating a user to allow the user access to the web server 18, the network 10 and implementation of MCPDO program 54 are equally applicable to embodiments in which it is desirable to securely transmit data from a user, but not necessarily to authenticate the user. That is, it is envisioned that the network 10 and the MCPDO program 54 can be implemented and utilized, as described above, absent the data comparison functionality indicated at 146, 160 and 164, to securely transmit any type of data between the client device 14 and the web server 18 without the risk of such data being intercepted by an attacker.

Thus, the network 10 and its implementation of the MCPDO program 54, as described above provides various features that affect highly secure communication between the client device 14 and the host server 18, e.g., web server 18. For example, among the features provided is a software based virtual keypad that allows data entry via a mouse and which uses character transmutation and window obscuration to prevent a screen grabbing daemon from capturing window contents. Another feature of the provided is an interactive page rendered at the client device that requires multi-channel field inputs, e.g., certain field inputs via keyboard and other field inputs via mouse. Still another feature provided is the provision of mixed method data submission wherein certain values are transmitted using short lived and upon submission immediately destroyed cookies while other values are submitted using POST data input. Still yet another feature provided the use of hash based data exchange.

Another feature provided is the use of meaningless field names in which all form fields and image names are assigned a random label that is only meaningful to the host sever 18 that generated the data entry form. Still another feature provided is the use of randomly generated meaningless, or invalid, submission data included with valid data entries of the POST data. Yet another feature provided is the use of randomly generated images to prevent automatic submission of the data entry form. Still yet another feature provided is the implementation of a standard credential table on the host device database 64 in conjunction with a second table utilized to manage the temporary data POST data received from the client device 14.

In view of the above, it will be seen that various features of the invention have been described and various advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A secure communication network comprising:
  at least one client device communicatively connectable to a host server to communicate data between the client device and the host server;
  the host server comprising:
    a means associated with the host server for polymorphically generating and embedding a plurality of obfuscation data and program code into a source code for a data entry form including generating a plurality of decoy form elements and embedding the decoy form elements into the source code of the data entry form; and
    a means associated with the host server for transmitting the source code for the data entry form to the client device; and
  the client device comprising:
    a means associated with the client device for establishing a communications connection with the host device;
    a means associated with the client device for interpreting the obfuscation data embedded in the data entry form source code to generate a consistently displayed interactive data entry page including a plurality of interactive data entry fields and a virtual keypad, the interactive data entry page rendered on a display of the client device; and
    a means associated with the client device for interpreting and executing the program code embedded in the data entry form source code to obfuscate data entered in at least one of the interactive data entry fields using a first user interface device of the client device and transmute data entered in at least one of the interactive data entry fields using a second user interface device.

2. The network of claim 1, wherein the first user interface comprises a physical keyboard and the second user interface device comprises a computer mouse.

3. The network of claim 1 further comprising:
  a means associated with the host server for generating a transmuted character map, storing the transmuted character map in a database of the host server, and embedding the transmuted character map into the source code of the data entry form; and
  a means associated with the host server for assigning the transmuted character map to the virtual keypad.

4. The network of claim 1 further comprising a means associated with the host server for generating a plurality of random form element ID tags, storing the random form element ID tags in a database of the host server, and embedding the random form ID tags in the source code of the data entry form.

5. The network of claim 1 further comprising a means associated with the host server for generating random names for image file names and locations stored on an electronic mass storage device of the host server, and embedding random image file names and locations in the source code of the data entry form.

6. The network of claim 1 further comprising a means associated with the host server for generating a random salt for POST data hashing, storing the random salt in a database of the host server, and embedding the random salt in the source code of the data entry form.

7. The network of claim 1 further comprising:
  a means associated with the host server for generating a random robot prevention image string and storing the random prevention image string in a database of the host server; and a means associated with the host server for generating a random name for the robot prevention image and embedding the random name for the robot prevention image in the source code of the data entry form.

8. The network of claim 1 further comprising a communications router structured and operable to route the data between the client device and the host server, wherein:
the host server comprises a web server;
the communication router comprises the Internet; and
the means associated with the client device for establishing a communications connection with the host device, interpreting the obfuscation data embedded in the data entry form source code to generate an interactive data entry page, and interpreting and executing the program code embedded in the data entry form source code to obfuscate data entered in at least one of the interactive data entry fields using a first user interface device of the client device and transmute data entered in at least one of the interactive data entry fields using a second user interface device comprises a web browser program stored on an electronic storage device of the client device and executed by a processor of the client device.

9. A method for providing secure communication within a communications network, said method comprising:
establishing a communications connection between a client device and a host device of the communications network;
polymorphically generating and embedding a plurality of obfuscation data and program code into a source code for a data entry form at the host server without change to the source code itself, wherein generating and embedding a plurality of obfuscation data and program code into a source code for a data entry form comprises generating a plurality of decoy form elements and embedding the decoy form elements into the source code of the data entry form;
transmitting the source code for the data entry form to the client device; and
executing an interface program stored on the client device to:
interpret the obfuscation data embedded in the data entry form source code and generate an interactive data entry page rendered on a display of the client device utilizing the obfuscation data, the interactive data entry page including a plurality of interactive data entry fields and a virtual keypad; and
interpret and execute the program code embedded in the data entry form source code to obfuscate data entered in at least one of the interactive data entry fields using a first user interface device of the client device and transmute data entered in at least one of the interactive data entry fields using a second user interface device.

10. The method of claim 9, wherein polymorphically generating and embedding a plurality of obfuscation data and program code into a source code for a data entry form comprises;
generating a transmuted character map, storing the transmuted character map in a database of the host server, and embedding the transmuted character map into the source code of the data entry form; and
assigning the transmuted character map to the virtual keypad.

11. The method of claim 9, wherein generating and embedding a plurality of obfuscation data and program code into a source code for a data entry form comprises generating a plurality of random form element ID tags, storing the random form element ID tags in a database of the host server, and embedding the random form ID tags in the source code of the data entry form.

12. The method of claim 9, wherein generating and embedding a plurality of obfuscation data and program code into a source code for a data entry form comprises a means associated with the host server for generating random names for image file names and locations stored on an electronic mass storage device of the host server, and embedding random image file names and locations in the source code of the data entry form.

13. The method of claim 9, wherein generating and embedding a plurality of obfuscation data and program code into a source code for a data entry form comprises generating a random salt for POST data hashing, storing the random salt in a database of the host server, and embedding the random salt in the source code of the data entry form.

14. The method of claim 9, wherein generating and embedding a plurality of obfuscation data and program code into a source code for a data entry form comprises:
generating a random robot prevention image string and storing the random prevention image string in a database of the host server; and
generating a random name for the robot prevention image and embedding the random name for the robot prevention image in the source code of the data entry form.

15. The method of claim 9, wherein the communications network includes a communications router structured and operable to route the data between the client device and the host server, and wherein the host server comprises a web server, the communication router comprises the Internet, and wherein executing a interface program stored on the client device comprises executing a web browser program stored on the client device.

16. The method of claim 9, wherein executing the interface program further comprises executing the program code embedded in the data entry from source code to:
concatenate the data entered using the first and second user interface devices;
apply a random salt to the concatenated data, the random salt generated at the host server and embedded in the data entry from source code;
hash the salted data; and
pass the hashed data to the host server.

17. The method of claim 16 further comprising:
decrypting the hashed data at the host server;
comparing the decrypted data to user credential data stored in an electronic mass storage database of the host device;
authenticating a user of the client device based on the data comparison; and
deleting the decrypted data from a memory device of the host server upon completion of comparing the decrypted data to user credential data.

18. A method of user authentication for a communications network, said method comprising:
establishing a communications connection with a client device and a host device of the communications network, via the communication router of the communications network;
polymorphically generating and embedding a plurality of obfuscation data and program code into a source code for a data entry form at the host server without change to the source code itself including generating a plurality of decoy form elements and embedding the decoy form elements into the source code of the data entry form;
transmitting the source code for the data entry form to the client device; and executing a router interface program stored on the client device to:
    interpret the obfuscation data embedded in the data entry form source code and generate an interactive data entry page rendered on a display of the client device utilizing the obfuscation data, the interactive data entry page including a plurality of interactive data entry fields and a virtual keypad;
    interpret and execute the program code embedded in the data entry form source code to obfuscate data entered in at least one of the interactive data entry fields using a first user interface device of the client device and transmute data entered in at least one of the interactive data entry fields using a second user interface device;
    concatenate the data entered using the first and second user interface devices;
    apply a random salt to the concatenated data, the random salt generated at the host server and embedded in the data entry from source code;
    hash the salted data;
    pass the hashed data to the host server;
    decrypting the hashed data at the host server;
    comparing the decrypted data to user credential data stored in an electronic mass storage database of the host device; and
    authenticating a user of the client device based on the data comparison.

* * * * *

UNITED STATES PATENT AND TRADEMARK OFFICE
CERTIFICATE OF CORRECTION

PATENT NO. : 8,495,358 B2
APPLICATION NO. : 12/676762
DATED : July 23, 2013
INVENTOR(S) : Richard Fendall Johnston, II, William J. Strauss and Dean Pierce Page 1 of 1

It is certified that error appears in the above-identified patent and that said Letters Patent is hereby corrected as shown below:

In the Specification

In Column 1, line 11, after the word filed replace "September 9, 2007" with --September 7, 2007--.

Signed and Sealed this
First Day of July, 2014

Michelle K. Lee
*Deputy Director of the United States Patent and Trademark Office*